(12) United States Patent
Shim et al.

(10) Patent No.: US 8,990,462 B2
(45) Date of Patent: Mar. 24, 2015

(54) STORAGE DEVICE, COMPUTING SYSTEM INCLUDING THE SAME AND DATA TRANSFERRING METHOD THEREOF

(71) Applicants: Hojun Shim, Yongin-si (KR); Eunchan Kim, Suwon-si (KR)

(72) Inventors: Hojun Shim, Yongin-si (KR); Eunchan Kim, Suwon-si (KR)

(73) Assignee: Samsung Electronics Co., Ltd, Gyeonggi-Do ( * ) Notice: Subject to any disclaimer, the term of this patent is extended or adjusted under 35 U.S.C. 154(b) by 0 days.

(21) Appl. No.: 14/038,892

(22) Filed: Sep. 27, 2013

(65) Prior Publication Data
US 2014/0149607 A1 May 29, 2014

(30) Foreign Application Priority Data
Nov. 26, 2012 (KR) .................. 10-2012-0134589

(51) Int. Cl.
*G06F 3/06* (2006.01)
*G06F 13/24* (2006.01)
*G06F 13/28* (2006.01)
*G06F 13/38* (2006.01)

(52) U.S. Cl.
CPC .............. *G06F 3/0659* (2013.01); *G06F 13/24* (2013.01); *G06F 13/28* (2013.01); *G06F 3/061* (2013.01); *G06F 3/0689* (2013.01)
USPC ............ 710/72; 710/2; 710/5; 710/8; 710/11; 710/14

(58) Field of Classification Search
None
See application file for complete search history.

(56) References Cited

U.S. PATENT DOCUMENTS

| 8,055,816 | B2 | 11/2011 | Asnaashari et al. |
| 8,131,889 | B2 | 3/2012 | Lee et al. |
| 8,225,019 | B2 | 7/2012 | Asnaashari |
| 8,244,937 | B2 | 8/2012 | Klein |
| 2006/0106980 | A1 | 5/2006 | Kobayashi et al. |
| 2008/0229079 | A1 | 9/2008 | Flynn et al. |
| 2010/0161936 | A1* | 6/2010 | Royer et al. .................. 711/209 |
| 2010/0287333 | A1 | 11/2010 | Lee et al. |
| 2011/0131346 | A1* | 6/2011 | Noeldner et al. ............... 710/22 |
| 2011/0296131 | A1 | 12/2011 | Yim et al. |

FOREIGN PATENT DOCUMENTS

| JP | 2006139548 A | 6/2006 |
| KR | 20100120518 A | 11/2010 |

* cited by examiner

*Primary Examiner* — Scott Sun
(74) *Attorney, Agent, or Firm* — Harness, Dickey & Pierce, P.L.C.

(57) ABSTRACT

A data transfer method of a storage device which includes a host bus adaptor to communicate with an external host via a first interface and to communicate internally via a second interface is provided. The data transfer method may include issuing a write command and a read command to the host bus adaptor; performing a read direct memory access operation using the first interface in response to the write command and simultaneously performing a write direct memory access operation using the second interface in response to the read command; and generating frame information structure (FIS) sequences according to the second interface in response to the issued write command and the issued read command. The first interface may perform a full duplex data transfer and the second interface may perform a half-duplex data transfer.

25 Claims, 23 Drawing Sheets

Fig. 11

| Start(hex) | End(hex) | Symbol | Name |
|---|---|---|---|
| 00 | 03 | ID | Identifiers |
| 04 | 05 | CMD | Command Register |
| 06 | 07 | STS | Device Status |
| 08 | 08 | RID | Revision ID |
| 09 | 0B | CC | Class Codes |
| 0C | 0C | CLS | Cache Line Size |
| 0D | 0D | MLT | Master Latency Timer |
| 0E | 0E | HTYPE | Header Type |
| 0F | 0F | BIST | Built In Self Test(Optional) |
| 10 | 23 | BARS | Other Base Address Register(Optional)<BAR04> |
| 24 | 27 | ABAR | AHCI Base Address<BAR5> |
| 2C | 2F | SS | Subsystem Identifiers |
| 30 | 33 | EROM | Expansion ROM Base Address(Optional) |
| 34 | 34 | CAP | Capabilities Pointer |
| 3C | 3D | INTR | Interrupt Information |
| 3E | 3E | MGNT | Min Grant(Optional) |
| 3F | 3F | MLAT | Max Latency(Optional) |

ABAR+0x0000:GHC Registers
ABAR+0x0100:Port Register

Fig. 12

| Start | End | Symbol | Description |
|---|---|---|---|
| 00h | 03h | CAP | Host Capabilities |
| 04h | 07h | GHC | Global Host Control |
| 08h | 0Bh | IS | Interrupt Status |
| 0Ch | 0Fh | PI | Ports Implemented |
| 10h | 13h | VS | Version |
| 14h | 17h | CCC_CTL | Command Completion Coalescing Control |
| 18h | 1Bh | CCC_PORTS | Command Completion Coalescing Ports |
| 1Ch | 1Fh | EM_LOC | Enclosure Management Location |
| 20h | 23h | EM_CTL | Enclosure Management Control |
| 24h | 27h | CAP2 | Host Capabilities Extended |
| 28h | 2Bh | BOHC | BIOS/OS Handoff Control and Status |

Fig. 13

| Start | End | Symbol | Description |
|---|---|---|---|
| 00h | 03h | PxCLB | PortxCommand List Base Address |
| 04h | 07h | PxCLBU | PortxCommand List Base Address Upper 32-Bits |
| 08h | 0Bh | PxFB | PortxFIS Base Address |
| 0Ch | 0Fh | PxFBU | PortxFIS Base Address Upper 32-Bits |
| 10h | 13h | PxIS | PortxInterrupt Status |
| 14h | 17h | PxIE | PortxInterrupt Enable |
| 18h | 1Bh | PxCMD | PortxCommand and Status |
| 1Ch | 1Fh | Reserved | Reserved |
| 20h | 23h | PxTFD | PortxTask File Data |
| 24h | 27h | PxSIG | PortxSignature |
| 28h | 2Bh | PxSSTS | PortxSerial ATA Status(SCR0:SStatus) |
| 2Ch | 2Fh | PxSCTL | PortxSerial ATA Control(SCR2:Control) |
| 30h | 33h | PxSERR | PortxSerial ATA Error(SCR1:SError) |
| 34h | 37h | PxSACT | PortxSerial ATA Active(SCR3:SActive) |
| 38h | 3Bh | PxCI | PortxCommand Issue |
| 3Ch | 3Fh | PxSNTF | PortxSerial ATA Notification(SCR4:SNotification) |
| 40h | 43h | PxFBS | PortxFIS-based Switching Control |
| 44h | 6Fh | Reserved | Reserved |
| 70h | 7Fh | PxVS | PortxVendor Specific |

Fig. 14A

| Type field value | Description |
|---|---|
| 27h | Register FIS-Host to Device |
| 34h | Register FIS-Device to Host |
| 39h | DMA Active FIS-Device to Host |
| 41h | DMA Setup FIS-Bi-directional |
| 46h | Data FIS-Bi-Directional |
| 58h | BIST Active FIS-Bi-Directional |
| 5Fh | PIO Setup FIS-Device to Host |
| A1h | Set Device Bits FIS-Device to Host |
| A6h | Reserved for Future Serial ATA Definition |
| B8h | Reserved for Future Serial ATA Definition |
| BFh | Reserved for Future Serial ATA Definition |
| C7h | Vendor Specific |
| D4h | Vendor Specific |
| D9h | Reserved for Future Serial ATA Definition |

Fig. 14B

| | | | |
|---|---|---|---|
| 0 | Features | Command | C R R R PM Port | FIS Type(27h) |
| 1 | Device | LBA High | LBA Mid | LBA Low |
| 2 | Features(exp) | LBA High(exp) | LBA Mid(exp) | LBA Low(exp) |
| 3 | Control | Reserved(0) | Sector Count(exp) | Sector Count |
| 4 | Reserved(0) | Reserved(0) | Reserved(0) | Reserved(0) |

Fig. 14C

| | | | |
|---|---|---|---|
| 0 | Error | Status | R I R R PM Port | FIS Type(34h) |
| 1 | Device | LBA High | LBA Mid | LBA Low |
| 2 | Reserved(0) | LBA High(exp) | LBA Mid(exp) | LBA Low(exp)(0) |
| 3 | Reserved(0) | Reserved(0) | Sector Count(exp) | Sector Count |
| 4 | Reserved(0) | Reserved(0) | Reserved(0) | Reserved(0) |

Fig. 14D

| | Features | Command | R | I | D | R | PM Port | FIS Type(5h) |
|---|---|---|---|---|---|---|---|---|
| 0 | | | | | | | | |
| 1 | Device | LBA(23:16) | | | | | LBA(15:8) | LBA(7:0) |
| 2 | Reserved(0) | LBA(47:40) | | | | | LBA(39:32) | LBA(31:24) |
| 3 | E_Status | Reserved(0) | | | | | Count(15:8) | Count(7:0) |
| 4 | Reserved(0) | | | | | | Transfer Count | |

Fig. 14E

| | Reserved(0) | A | I | D | R | PM Port | FIS Type(41h) |
|---|---|---|---|---|---|---|---|
| 0 | | | | | | | |
| 1 | DMA Buffer Identifier Low ||||||| 
| 2 | DMA Buffer Identifier High ||||||| 
| 3 | Reserved(0) ||||||| 
| 4 | DMA Buffer Offset ||||||| 
| 5 | DMA Transfer Count ||||||| 
| 6 | Reserved(0) |||||||

Fig. 14F

| | Reserved(0) | R | R | R | R | PM Port | FIS Type(39h) |
|---|---|---|---|---|---|---|---|
| 0 | | | | | | | |

Fig. 14G

| Features | Command | R | R | R | PM Port | FIS Type(46h) |
|---|---|---|---|---|---|---|
| 0 | | | | | | |
| ⋮ | N Dwords of data | | | | | |
| ⋮ | (minimum of one Dword-maximum of 2048 Dwords) | | | | | |
| n | | | | | | |

Fig. 14H

| Error | R | Status Hi | Status Lo | N | I | R | R | PM Port | FIS TypeA1h) |
|---|---|---|---|---|---|---|---|---|---|
| 0 | | | | | | | | | |
| 0 | Reserved(0) | | | | | | | | |

STORAGE DEVICE, COMPUTING SYSTEM INCLUDING THE SAME AND DATA TRANSFERRING METHOD THEREOF

CROSS-REFERENCE TO RELATED APPLICATIONS

A claim for priority under 35 U.S.C. §119 is made to Korean Patent Application No. 10-2012-0134589 filed Nov. 26, 2012, in the Korean Intellectual Property Office, the entire contents of which are hereby incorporated by reference.

BACKGROUND

Example embodiments of the inventive concepts relate to a storage device, a computing system including the same, and a data transferring method thereof.

In recent years, a solid state drive (SSD) may have been used as a storage device of a computing system. The SSD may employ a nonvolatile memory (e.g., a flash memory) to store data. Compared with a typical hard disk drive, the SSD may be advantageous in terms of endurance, size, power, and so on. The SSDs may be divided into a Peripheral Component Interconnect (PCI) SSD and a Serial Advanced Technology Attachment (SATA) SSD according to a communication method with a host.

SUMMARY

Some example embodiments of the inventive concepts relate to a data transfer method of a storage device.

According to an example embodiment, a data transfer method of a storage device which includes a host bus adaptor to communicate with an external host via a first interface and to communicate internally via a second interface is provided. The data transfer method may include issuing a write command and a read command to the host bus adaptor; performing a read direct memory access operation using the first interface in response to the write command and simultaneously performing a write direct memory access operation using the second interface in response to the read command; and generating frame information structure (FIS) sequences according to the second interface in response to the issued write command and the issued read command. The first interface may perform a full duplex data transfer and the second interface may perform a half-duplex data transfer.

According to another example embodiment of the inventive concepts a data transfer method of a storage device which includes a CPU, a main memory, and a storage device including a host bus adaptor to communicate with the CPU via a first interface and to communicate internally via a second interface is provided. The data transfer method may comprise transferring a command queue corresponding to an input/output request from the CPU to the main memory; transferring information to the host buffer adaptor that indicates that the input/output request from the CPU to the main memory is made; fetching the input/output request by sending a frame information structure (FIS) corresponding to the input/output request to the main memory in response to the information at the storage device; performing a data transfer between the main memory and the storage device corresponding to the input/output request according to the first interface at the storage device; generating a FIS sequence according to the second interface after the data transfer; generating an interrupt at the storage device; and completing the input/output request based on the interrupt at the CPU.

According to another example embodiment of the inventive concepts a storage device is provided. The storage device may comprise a first interface circuit configured to transmit and receive data according to a first interface; a host bus adaptor configured to communicate with the first interface circuit according to the first interface; a second interface emulator configured to communicate with the host bus adaptor according to a second interface; a direct memory access circuit configured to perform a data transfer with an external host memory; at least one nonvolatile memory device configured to store data; and a memory controller configured to control the at least one nonvolatile memory device according to an input/output request output from the second interface emulator. The direct memory access circuit may be configured to perform a full duplex data transfer from the first interface at the data transfer, and a frame information structure (FIS) sequence according to the second interface is generated after the data transfer.

According to another example embodiment of the inventive concepts a computing system is provided. The computing system may comprise a host bus; a host processor connected with the host bus via a first interface; a RAID controller connected with the host bus via the first interface and configured to perform a RAID function; and a plurality of storage devices connected with the RAID controller via the first interface. At least one of the plurality of storage devices may comprise a first interface circuit configured to communicate with an external device according to the first interface; a host bus adaptor configured to communicate with the first interface circuit according to the first interface; a second interface emulator configured to communicate with the host bus adaptor according to a second interface; a direct memory access circuit configured to perform a data transfer with an external host memory; at least one nonvolatile memory device configured to store data; and a memory controller configured to control the at least one nonvolatile memory device according to an input/output request output from the second interface emulator. The direct memory access circuit may be configured to perform a full duplex data transfer from the first interface at the data transfer. A frame information structure (FIS) sequence according to the second interface may be generated after the data transfer.

According to another example embodiment, a computer system is provided. The computer system may include a processor, a main memory, and a storage device. The main memory may be configured to receive an input/output request from the processor. The storage device may be configured to receive doorbell information from the processor indicating that the input/output request has been made; fetch the input/output request from the main memory by sending frame information structure (FIS) related information to the main memory in response to receiving the doorbell information; automatically update the nonvolatile memory device with the FIS related information corresponding to the input/output request; perform a data transfer operation according to the input/output request, the data transfer operation being performed between the main memory and the storage device send an interrupt to the processor when the data transfer operation is completed; and receive, from the processor, information indicating that the input/output request is completed, the information indicating that the input/output request is completed being based on the interrupt.

BRIEF DESCRIPTION OF THE FIGURES

The above and other objects and features will become apparent from the following description with reference to the following figures, wherein like reference numerals refer to like parts throughout the various figures unless otherwise specified, and wherein

FIG. 11 is a diagram schematically illustrating a PCI header of a data packet input or output in or from an AHCI engine of FIG. 10;

FIG. 12 is a diagram schematically illustrating host control information stored at an AHCI engine of FIG. 10;

FIG. 13 is a diagram schematically illustrating port information stored at an AHCI engine of FIG. 10;

FIGS. 14A to 14H are diagrams schematically illustrating the specification on FIS transferred between an AHCI engine and a SATA emulator of FIG. 10;

DETAILED DESCRIPTION

Figure 1:
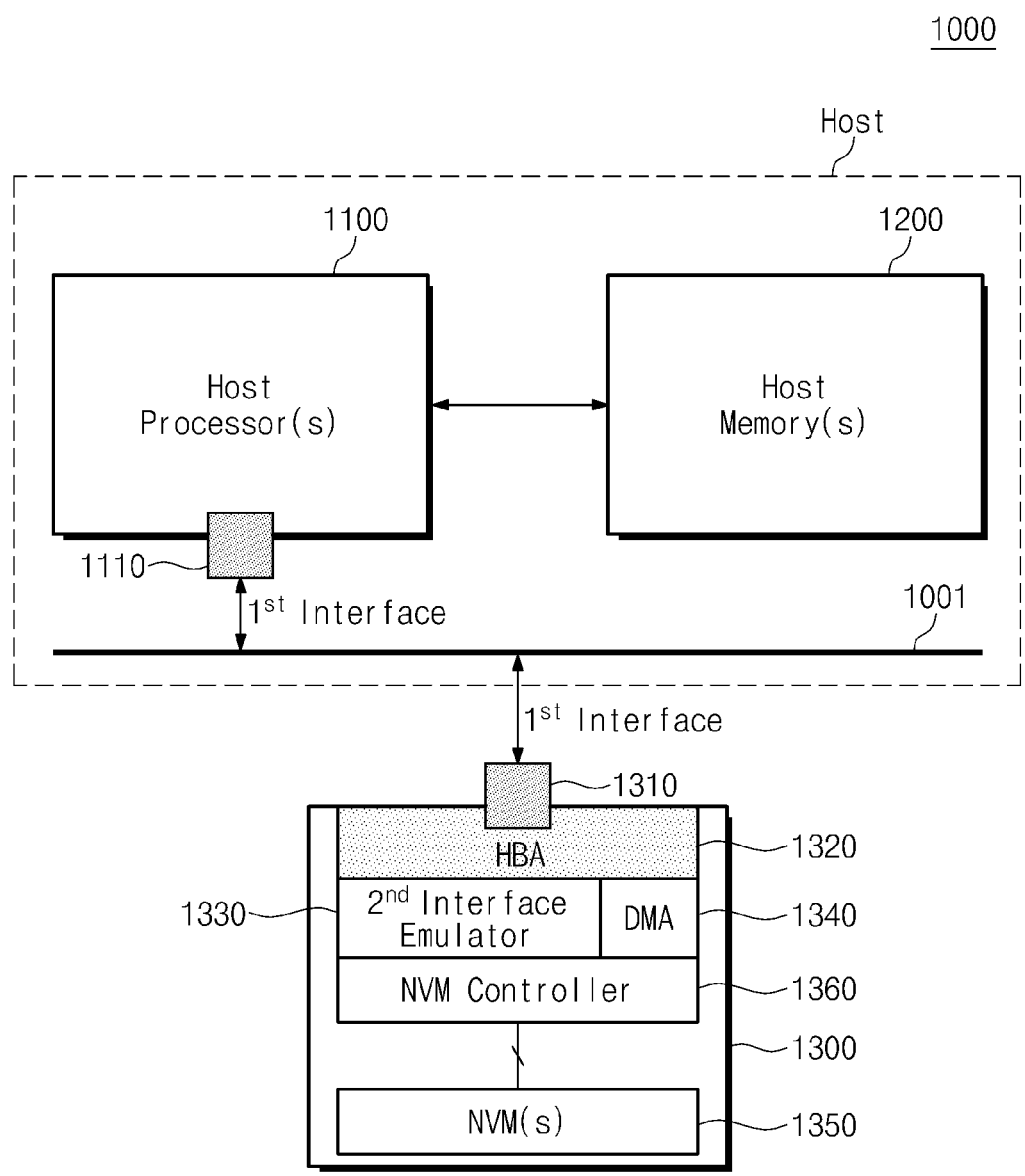
FIG. 1 is a block diagram schematically illustrating a computing system according to an example embodiment of the inventive concepts.

Embodiments will be described in detail with reference to the accompanying drawings. The inventive concepts, however, may be embodied in various different forms, and should not be construed as being limited only to the illustrated embodiments. Rather, these embodiments are provided as examples so that this disclosure will be thorough and complete, and will fully convey the concepts of the inventive concepts to those skilled in the art. Accordingly, known processes, elements, and techniques are not described with respect to some of the example embodiments of the inventive concepts. Unless otherwise noted, like reference numerals denote like elements throughout the attached drawings and written description, and thus descriptions will not be repeated. In the drawings, the sizes and relative sizes of layers and regions may be exaggerated for clarity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concepts.

The terminology used herein is for the purpose of describing particular embodiments only and is not intended to be limiting of the inventive concepts. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which the inventive concepts belong. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

FIG. 1 is a block diagram schematically illustrating a computing system 1000 according to an embodiment of the inventive concepts. Referring to FIG. 1, a computing system 1000 may include a host bus 1001, at least one host processor 1100, at least one host memory 1200, and a storage device 1300. Below, the components 1001, 1100 and 1200 may be referred to as a host.

The host bus 1001 may transfer data according to a first interface between components (e.g., processor 1100 and the storage device 1300) of the computing system 1000. Herein, the first interface may be a full duplex interface (or, a bidirectional data transfer interface). That is, that first interface may provide a transmission channel TX and a reception channel RX that are used independently. For example, the first interface may be a Fiber Channel (FC) interface, a Universal Serial Bus (USB) 3.0 interface, a USB 2.0 interface, a Serial Attached SCSI (SAS), a Peripheral Component Interconnect express (PCIe) interface, an Serial Peripheral interface (SPI), a thunderbolt Interface, a lightning bolt interface, or other like interfaces.

The host processor 1100 may control an overall operation of the computing system 1000. The host processor 1100 may include a first interface circuit 1110. The first interface circuit 1110 may be connected with the host bus 1001 according to the first interface. The host processor 1100 may include a memory controller (not shown) configured to control the host memory 1200.

The host memory 1200 may be connected with the host processor 1100, and may store data needed during an operation according to a control of the host processor 1100. The host memory 1200 may be implemented using a volatile memory device such as a DRAM or a nonvolatile memory device such as a PRAM.

The storage device 1300 may be connected with the host bus 1001 according to the first interface, and may store data. The storage device 1300 may communicate with the host externally according to the first interface and perform a data transfer operation internally according to a second interface. Unlike the first interface, the second interface may be a half-duplex interface (or, a unidirectional data transfer interface). For example, the second interface may be an ATA interface, a SATA interface or other like interface.

The storage device 1300 may include a first interface circuit 1310 (referred to as an external interface circuit), a host bus adaptor 1320, a second interface emulator 1330 (referred to as an internal interface circuit), a DMA circuit 1340, at least one nonvolatile memory device 1350, and a memory controller 1360.

The first interface circuit 1310 may be connected with the host bus 1001, and may communicate with an external device according to the first interface.

The host bus adaptor 1320 may communicate with the first interface circuit 1310 according to the first interface. The host bus adaptor 1320 may be software and/or hardware implemented such that the storage device 1300 recognizes at least one command output from the host processor 1100. In example embodiments, the host bus adaptor 1320 may be an Advanced Host Controller Interface (AHCI).

The second interface emulator 1330 may communicate with the host bus adaptor 1320 according to the second interface. According to various embodiments, the host bus adaptor 1320 may receive write commands and/or read commands according to a native command queuing scheme. The second interface emulator 1330 may be implemented to provide second interface emulation for the storage device 1300. For example, the second interface emulator 1330 may communicate with the host bus adaptor 1320 using a frame information structure (FIS) of the second interface. The FIS may be a data packet formatted or otherwise configured according to the second interface specification. The second interface emulator 1330 may process a FIS transaction to/from the memory controller 1360 or a FIS of the host via the host bus adaptor 1320.

The DMA circuit 1340 may be configured to control the first interface circuit 1310 according to a native command queuing (NCQ) command (e.g., write command or read command) input from the host processor 1100 such that the storage device 1300 reads/writes data from/to the host memory 1200. The DMA circuit 1340 may have transmission and reception DMA circuits (not shown) which are configured to perform a full duplex data transfer operation using a transmission channel TX and a reception channel RX of the host bus 1001.

The at least one nonvolatile memory device 1350 may be a device to store data, and may be at least one of a flash memory (e.g., a NAND flash memory), a phase-change RAM (PRAM), a magnetic RAM (MRAM), a resistive RAM (RRAM), a ferroelectric RAM (FRAM), a vertical NAND (VNAND), and other like memory devices.

The memory controller 1360 may control the at least one nonvolatile memory device 1350 according to a FIS transaction transferred from the second interface emulator 1330.

In general, a storage device supporting the second interface (e.g., a half-duplex data transfer interface) may not perform a full duplex data transfer operation. On the other hand, the computing system 1000 according to an embodiment of the inventive concepts may include the host bus adaptor 1320, which supports the first interface (e.g., a full duplex data transfer interface), and the second interface emulator 1330 which enables the storage device 1300 communicates with a host bus adaptor using an FIS of the second interface, so that it transfers data internally according to the second interface and performs a full duplex data transfer operation externally according to the first interface. That is, with the computing system 1000 of the inventive concepts, a data transfer speed may double with a condition of the second interface being satisfied.

Additionally, the computing system 1000 of the inventive concepts may include the storage device 1300 having the host bus adaptor 1320 supporting the first interface, such that development on a host driver for the storage device 1300 is not required. According to various embodiments, the host processor 1100 of the inventive concepts may drive the storage device 1300 of the inventive concepts using a conventional host driver.

Figure 2:
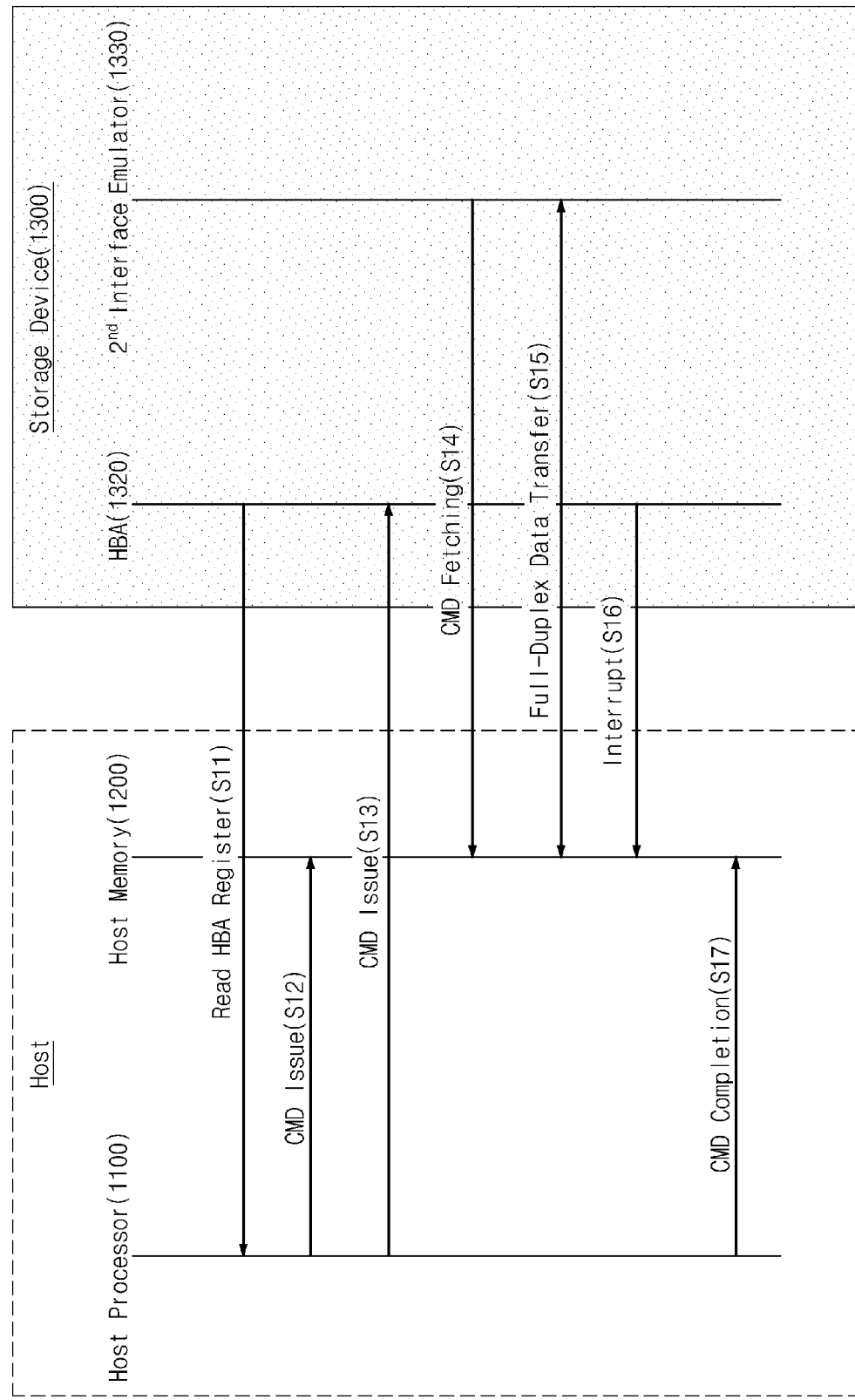
FIG. 2 is a diagram schematically illustrating a data flow between a host and a storage device according to an example embodiment of the inventive concepts.

FIG. 2 is a diagram schematically illustrating a data flow between a host and a storage device according to an embodiment of the inventive concepts. Below, a data flow between a host and a storage device will be described with reference to FIGS. 1 and 2.

A host processor 1100 may check whether a storage device 1300 can perform an NCQ command (e.g., a write command or a read command). Accordingly, the host processor 1100 may be configured to read a register of a host bus adaptor 1320 to check whether a prior command is completed (S11). If a checking result indicates that a prior command is completed, the host processor 1100 may issue a command CMD to a host memory 1200 (S12). The host processor 1100 may provide the host bus adaptor 1320 with a command FIS informing that a command CMD is issued to the host memory 1200 (S13). A second interface emulator 1330 may fetch a command by storing information (e.g., a command type, an address, data, and the like) associated with the command FIS at the host memory 1200. Thus, the host memory 1200 may set an area for a data transfer with the storage device 1300.

Afterwards, a data transfer may be performed between the host memory 1200 and the storage device 1300 by a read or write command CMD, with the second interface specification being satisfied. According to various embodiments, a data transfer may be a full duplex data transfer. In such embodiments, a full duplex data transfer may be performed according to read and write commands simultaneously received or a full duplex data transfer may be performed under a state where read and write commands are mixed (S15). If a data transfer is completed, the host bus adaptor 1320 may send an interrupt to the host memory 1200 (S16). The host processor 1100 may transfer to the host memory 1200 command completion information informing that an operation corresponding to the command CMD is completed (S17).

The computing system 1000 according to the inventive concepts may perform a full duplex data transfer according to the NCQ command CMD.

Figure 3:
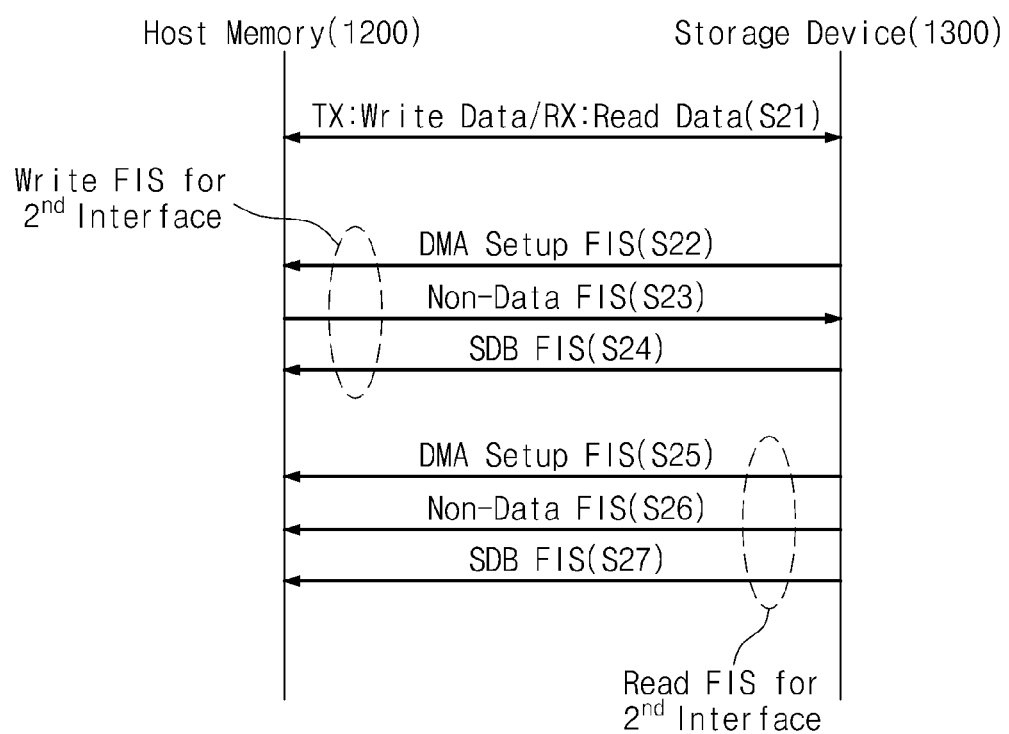
FIG. 3 is a flow chart schematically illustrating a full duplex transfer of FIG. 2.

FIG. 3 is a flow chart schematically illustrating a full duplex transfer of FIG. 2.

Referring to FIG. 3, a transmission DMA circuit in a DMA circuit 1340 may be configured to receive write data from a host memory 1200 using a transmission channel TX of a host bus 1001 according to a write command. A reception DMA circuit may be configured to transmit read data to the host memory 1200 using a reception channel RX of the host bus 1001 according to a read command (S21). That is, a transfer of write data and a transfer of read data may be performed in parallel.

If a transfer of the write data via a transmission channel TX of the host bus 1001 is completed, write data FIS (DMA Setup FIS, Non-Data FIS, and set device bits (SBD) FIS) according to the second interface specification may be transferred to the host memory 1200 (S22, S23 and S24). Herein, the DMA Setup FIS may include information indicating that a DMA circuit 1340 may be configured for data transmission. The Non-Data FIS may include information indicating that data does not exist. The SDB FIS may include information indicating whether data transmission is completed or a transmission state is successful. According to various embodiments, the Non-Data FIS may be generated from the host memory 1200 and sent to the storage device 1300. Although not shown, to satisfy the second interface transfer specification, the Data FIS may include a header generated from a second interface emulator 1330, and a host bus adaptor 1320 may use the Data FIS generated for second interface emulation.

If a transfer of read data via a reception channel RX of the host bus 1001 is completed, read data FIS (e.g., DMA Setup FIS, Non-Data FIS, and SDB FIS) according to the second interface specification may be sent to the host memory 1200 (S25, S26 and S27). According to various embodiments, the DMA Setup FIS may include information indicating whether to use a DMA circuit 1340 for data reception, the Non-Data FIS may include information indicating that data does not exist, and the SDB FIS may include information indicating whether data reception is completed or a reception state is successful.

In example embodiments, the write data FIS and the read data FIS may be used to sequentially generated after one of write data and read data are transferred.

In example embodiments, each of the write data FIS and the read data FIS may be used to sequentially generate DMA Setup FIS, Non-Data FIS, and SDB FIS.

With a full duplex data transfer method of the inventive concepts, after write data and read data according to the first interface specification are transferred, the DATA FIS (Write FIS and Read FIS) according to the second interface specification may be virtually generated and transmitted.

Figure 4:
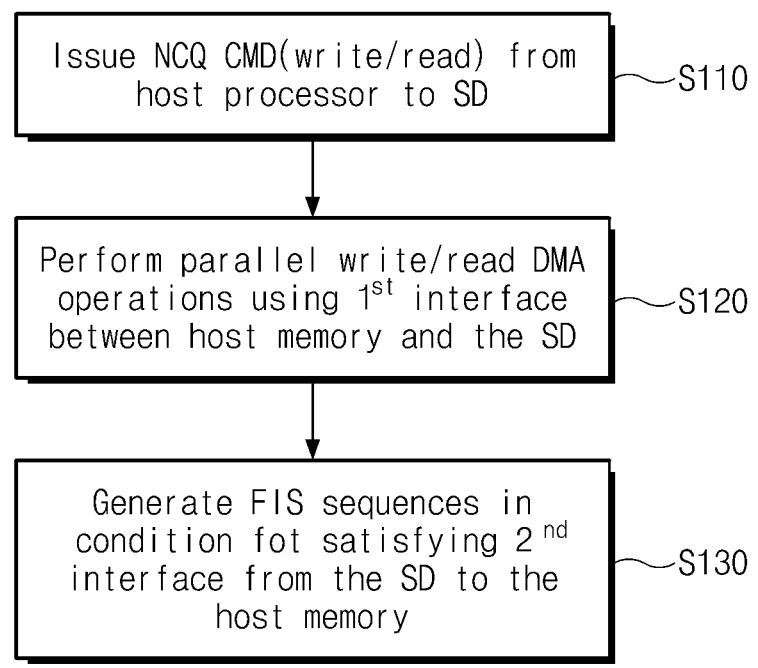
FIG. 4 is a flow chart schematically illustrating a data transfer method according to an example embodiment of the inventive concepts.

FIG. 4 is a flow chart schematically illustrating a data transfer method according to an embodiment of the inventive concepts. Below, a data transfer method according to an embodiment of the inventive concepts will be described with reference to FIGS. 1 to 4.

A host processor 1100 may be configured to issue an NCQ command (read/write) to a storage device 1300 (S110). According to various embodiments, the NCQ command may issue a write command and a read command simultaneously or sequentially. A write DMA operation and a read DMA operation may be performed in parallel between a host memory 1200 and the storage device 1300 using a first interface according to the NCQ command (S120). After the write DMA operation and the read DMA operation are completed, a data FIS sequence (e.g., DMA Setup FIS→Non-Data FIS→SDB FIS) for satisfying a second interface may be transferred from the storage device 1300 to the host memory 1200 (S130).

With the data transfer method of the inventive concepts, after DMA operations may be performed according to the first interface specification, data FIS may be sent to according to the second interface specification.

A computing system 1000 described with reference to FIGS. 1 to 4 may include the storage device 1300 which is connected with a host bus 1001 externally, according to the first interface specification, and internally operates according to the second interface specification. The computing system 1000 may further include a storage device which is connected with the host bus 1001 according to the first interface specification.

Figure 5:
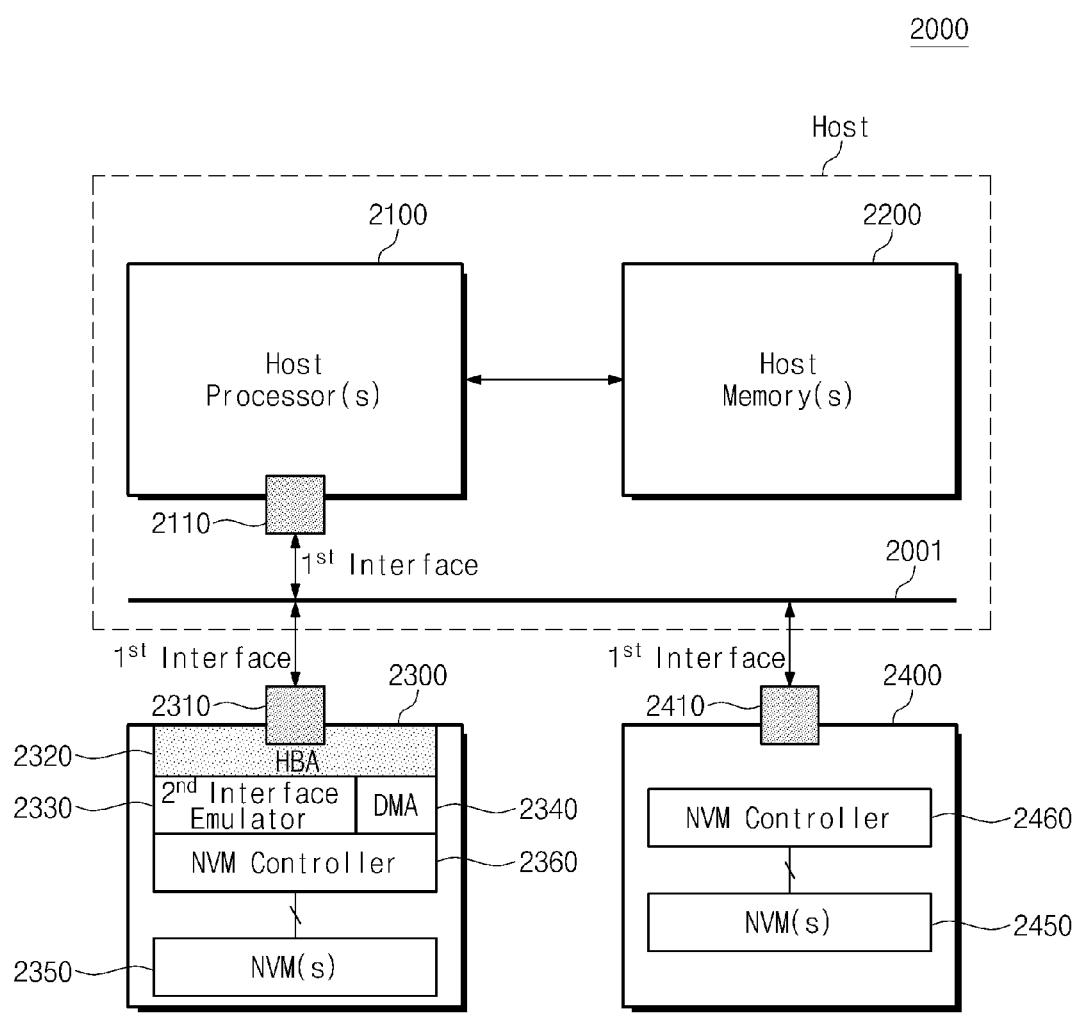
FIG. 5 is a block diagram schematically illustrating a computing system according to another example embodiment of the inventive concepts.

FIG. 5 is a block diagram schematically illustrating a computing system according to another embodiment of the inventive concepts. Referring to FIG. 5, a computing system 2000 may include a host bus 2001, at least one host processor 2100, at least one host memory 2200, a first storage device 2300, and a second storage device 2400. According to various embodiments, the host bus 2001, the host processor 2100, and the host memory 2200 may be the same or similar as a host bus 1001, a host processor 1100, and a host memory 1200, respectively. Additionally, according to various embodiments, the first storage device 2300, the first interface circuit 2310, a host bus adaptor 2320, the second interface emulator 2330, the DMA circuit 2340, the at least one nonvolatile memory device 2350, and the memory controller 2360 may be the same or similar as a storage device 1300, the first interface circuit 1310, the host bus adaptor 1320, the second interface emulator 1330, the DMA circuit 1340, the at least one nonvolatile memory device 1350, and the memory controller 1360, respectively.

The second storage device 2400 may be connected with the host bus 2001 according to a first interface. The second storage device 2400 may include a first interface circuit 2410, at least one nonvolatile memory device 2450, and a memory controller 2460. The first interface circuit 2410 may be implemented to communicate with a host according to the first interface specification. The memory controller 2460 may transfer commands and data according to the first interface specification, and may control the nonvolatile memory device 2450 according to a host request.

The second storage device 2400 may be also referred to as a first interface storage device. According to various embodiments, the storage device 2300 may be referred to as a pseudo first interface storage device.

A computing system according to an example embodiment of the inventive concepts may further comprise a Redundant Array of Independent Disks (RAID) function. According to various embodiments, the RAID function may allow a plurality of storage devices to operate in a similar manner as a logical device, and may be used to randomly expand a capacity of an individual storage device or to secure stability of data stored at a storage device.

Figure 6:
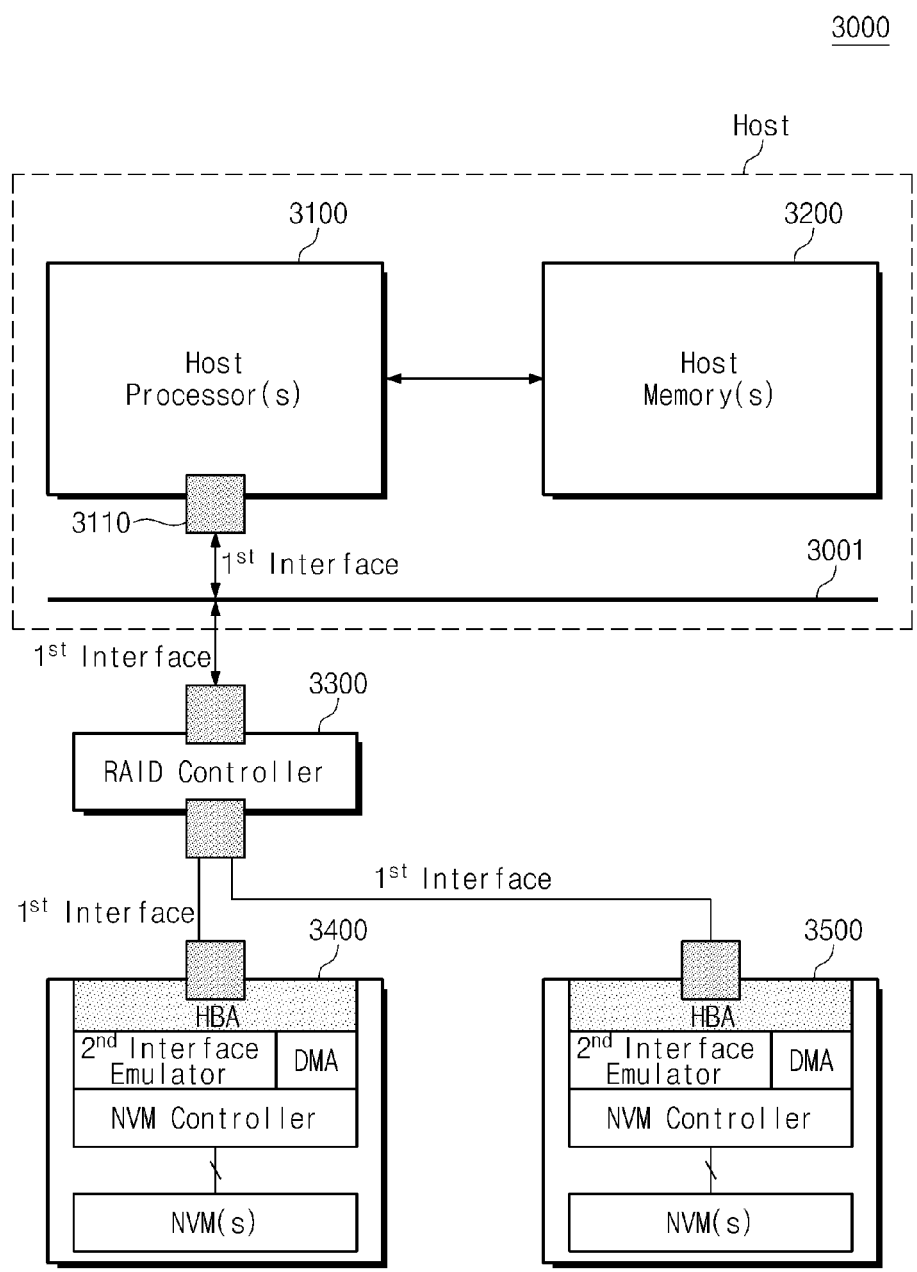
FIG. 6 is a block diagram schematically illustrating a computing system according to still another example embodiment of the inventive concepts.

FIG. 6 is a block diagram schematically illustrating a computing system according to still another embodiment of the inventive concepts. Referring to FIG. 6, a computing system 3000 may include a host bus 3001, at least one host processor 3100, at least one host memory 3200, a RAID controller 3300, a first storage device 3400, and a second storage device 3500. According to various embodiments, the host bus 3001, the host processor 3100, and the host memory 3200 may be the same or similar to host bus 1001, a host processor 1100, and a host memory 1200, respectively.

The RAID controller 3300 may be connected with the host bus 3001 according to a first interface, and may be configured to control the first and second storage devices 3400 and 3500 to provide a RAID function. According to various embodiments, the RAID function may include a data mirroring technique, such that data is stored at the first storage device 3400 and simultaneously the same data is stored at the second storage device 3500. The RAID controller 3300 may be connected with the first and second storage devices 3400 and 3500 according to the first interface. Each of the first and second storage devices 3400 and 3500 may be the same or similar to storage device 1300. In such embodiments, each of the first and second storage devices 3400 and 3500 may be a pseudo first interface storage device.

The computing system 3000 according to an embodiment of the inventive concepts may perform a RAID function using the pseudo first interface storage devices 3400 and 3500.

FIG. 6 illustrates an example in which the computing system 3000 includes two storage devices 3400 and 3500. However, the inventive concepts are not limited thereto. For example, according to various embodiments, the computing system 3000 may be implemented to perform a RAID function using three or more pseudo first interface storage devices.

Also, storage devices in the computing system 3000 may be pseudo first interface storage devices. However, the inventive concepts are not limited thereto. For example, according to various embodiments a computing system of the inventive concepts may include at least one HDD.

Figure 7:
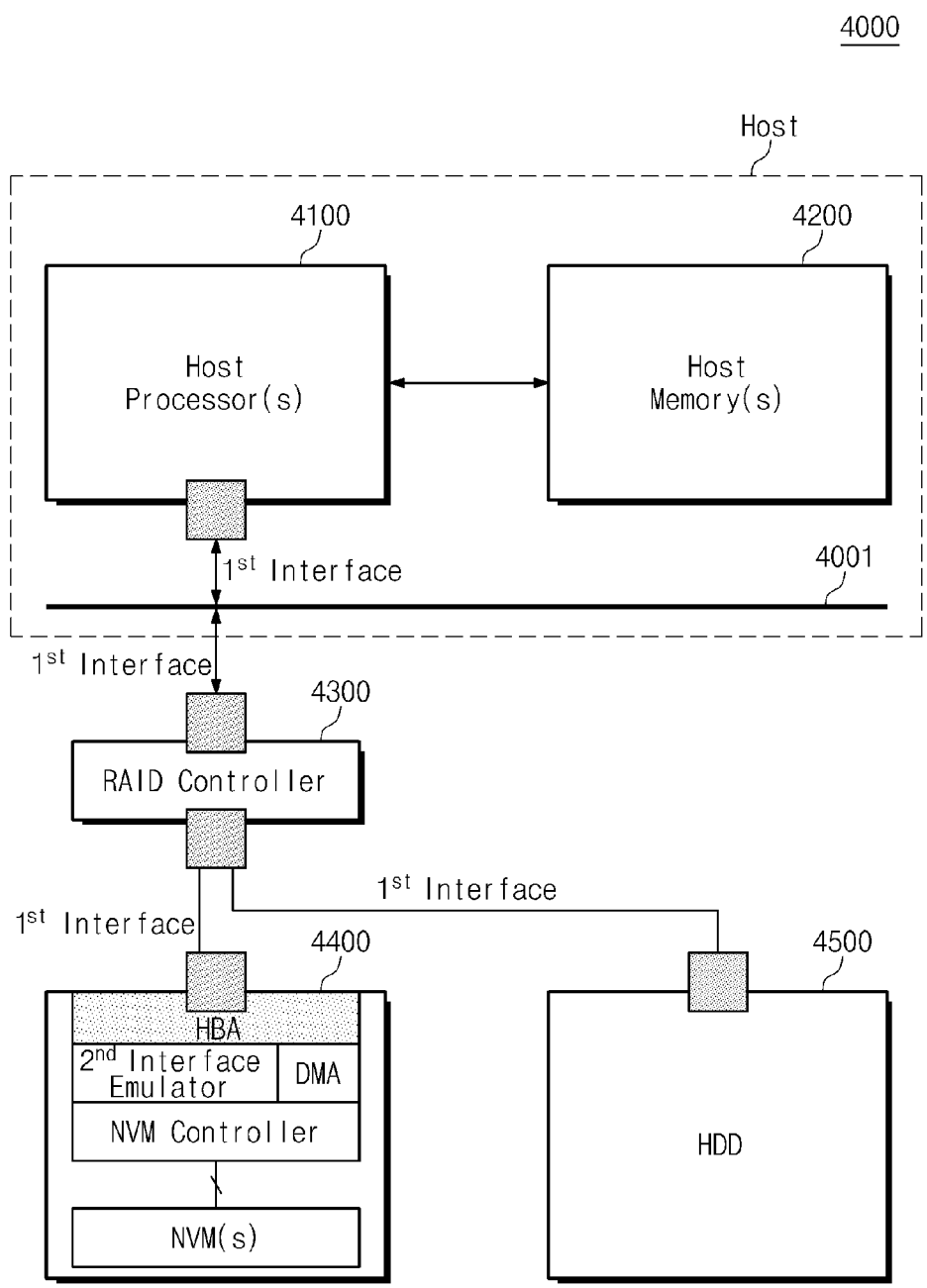
FIG. 7 is a block diagram schematically illustrating a computing system according to still another example embodiment of the inventive concepts.

FIG. 7 is a block diagram schematically illustrating a computing system according to still another embodiment of the inventive concepts. Referring to FIG. 7, a computing system 4000 may include a host bus 4001, at least one host processor 4100, at least one host memory 4200, a RAID controller 4300, a storage device 4400, and a HDD 4500. According to various embodiments, the host bus 4001, the host processor 4100, and the host memory 4200 may be the same or similar to host bus 1001, a host processor 1100, and a host memory 1200, respectively.

The RAID controller 4300 may be connected with the host bus 4001 according to a first interface, and may be configured to control the storage device 4400 and the HDD 4500 to provide a RAID function. The RAID controller 4300 may store write data at the storage device 4400 and the HDD 4500 at the same time in response to a write request of a host.

The computing system 400 according to an example embodiment of the inventive concepts may perform a RAID function in a hybrid manner using a pseudo first interface storage device 4400 and the HDD 4500.

In the computing system 400 according to the inventive concepts, a first interface may be a PCIe interface and a second interface may be a SATA interface.

Figure 8:
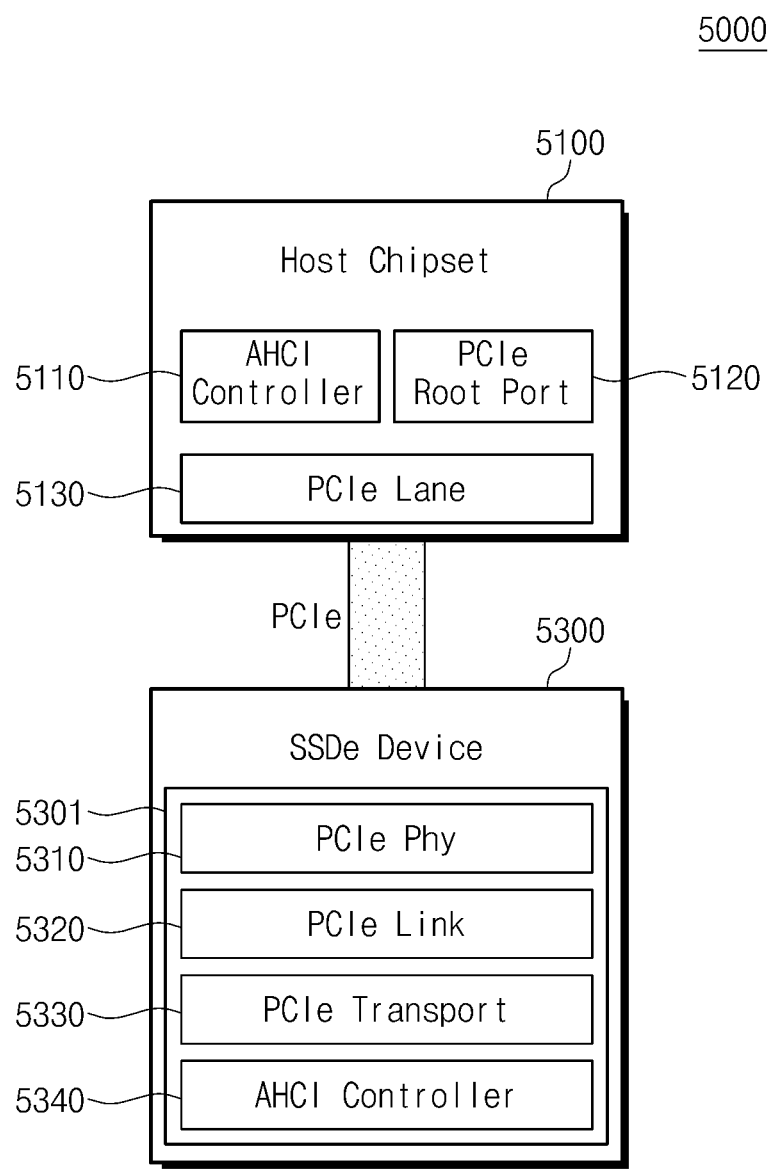
FIG. 8 is a block diagram schematically illustrating a computing system according to yet another example embodiment of the inventive concepts.

FIG. 8 is a block diagram schematically illustrating a computing system according to yet another embodiment of the inventive concepts. Referring to FIG. 8, a computing system 5000 may include a host chipset 5100 and an SSDe storage device 5300. The host chipset 5100 and the SSDe storage device 5300 may be interconnected via a PCIe interface.

The host chipset 5100 may include an AHCI controller 5100, a PCIe loop port 5120, and a PCIe lane 5130. The SSDe storage device 5300 may include an SSD controller 5301. The SSD controller 5301 may include a PCIe physical layer 5310, a PCIe link layer 5320, a PCIe transport layer 5330, and an AHCI controller 5340.

The PCIe physical layer 5310 may be connected with the PCIe loop port 5120 of the host chipset 5100 via the PCIe lane 5130. The PCIe physical layer 5310 may be configured to convert an analog signal input from the host chipset 5100 into digital data. The PCIe physical layer 5310 may be configured to convert digital data to be sent to the host chipset 5100 into an analog signal.

The PCIe link layer 5320 may be configured to perform PCIe standard encoding/decoding on digital data of the PCIe physical layer 5310.

The PCIe transport layer 5330 may manage FIS for transferring encoded/decoded data or data packets between the host chipset 5100 and an application layer. The AHCI controller 5340 may be configured to convert a data packet of the PCIe specification into a data packet of the SATAe specification.

The AHCI controller 5340 may enable the SSDe storage device 5300 to be recognized as a PCIe storage device connected with a host via a PCIe link.

The computing system 5000 may be configured to transmit and receive a data packet with a PCIe link layer format between the host chipset 5100 and the SSDe storage device 5300 via a PCIe lane.

A computing system according to an embodiment of the inventive concepts may be configured to include both a pseudo first interface storage device and a second interface storage device.

Figure 9:
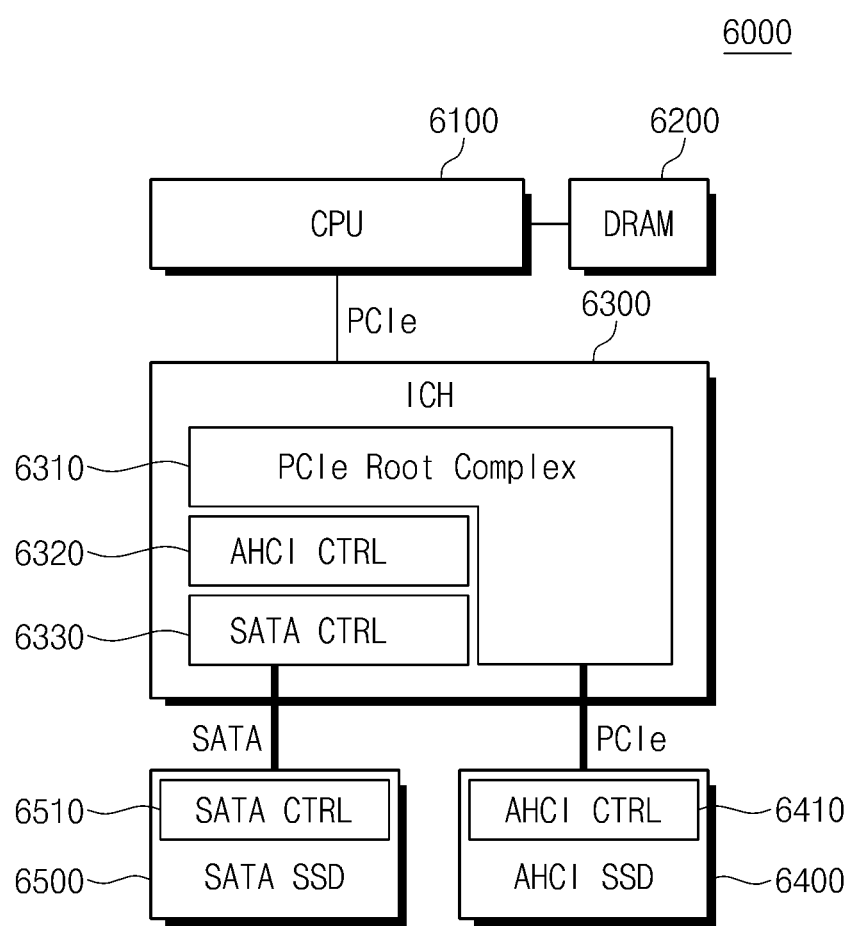
FIG. 9 is a block diagram schematically illustrating a computing system according to still another example embodiment of the inventive concepts.

FIG. 9 is a block diagram schematically illustrating a computing system according to still another embodiment of the inventive concepts. Referring to FIG. 9, a computing system 6000 may include a CPU 6100, a DRAM 6200, an internal channel controller 6300, an AHCI storage device 6400, and a SATA storage device 6500. The CPU 6100 and the DRAM 6200 may be the same or similar to a host processor 1100 and a host memory 1200 in FIG. 1, respectively.

The internal channel controller 6300 may be connected according to a PCIe interface and include a PCIe root complex 6310, an AHCI controller 6320, and a SATA controller 6330.

The AHCI storage device 6400 may be connected with the internal channel controller 6300 via a PCIe interface, and may include an AHCI controller 6410 to convert a data packet of the PICe specification into a data packet of the SATA specification. The AHCI storage device 6400 may be recognized as a PCIe storage device externally or be a SATA storage device internally. The AHCI storage device 6400 may be the same or similar to storage device 1300 in FIG. 1.

The SATA storage device 6500 may be connected with the internal channel controller 6300 via a SATA interface, and may include a SATA controller 6510 to process a data packet of the SATA specification. The SATA storage device 6500 may be configured to transmit and receive a SATA data packet according to a control of the SATA controller 6330 of the internal channel controller 6300. According to various embodiments, the SATA data packet being received and transmitted or may be converted into a PCIe data packet according to a control signal of the AHCI controller 6320 of the internal channel controller 6300, and the PCIe data packet may be transmitted and received to and from the CPU 6100 via the PCIe interface.

The computing system 6000 may include the SATA storage device 6500 and the pseudo PCIe storage device 6400 connected with the internal channel controller 6300 via the PCIe interface.

Figure 10:
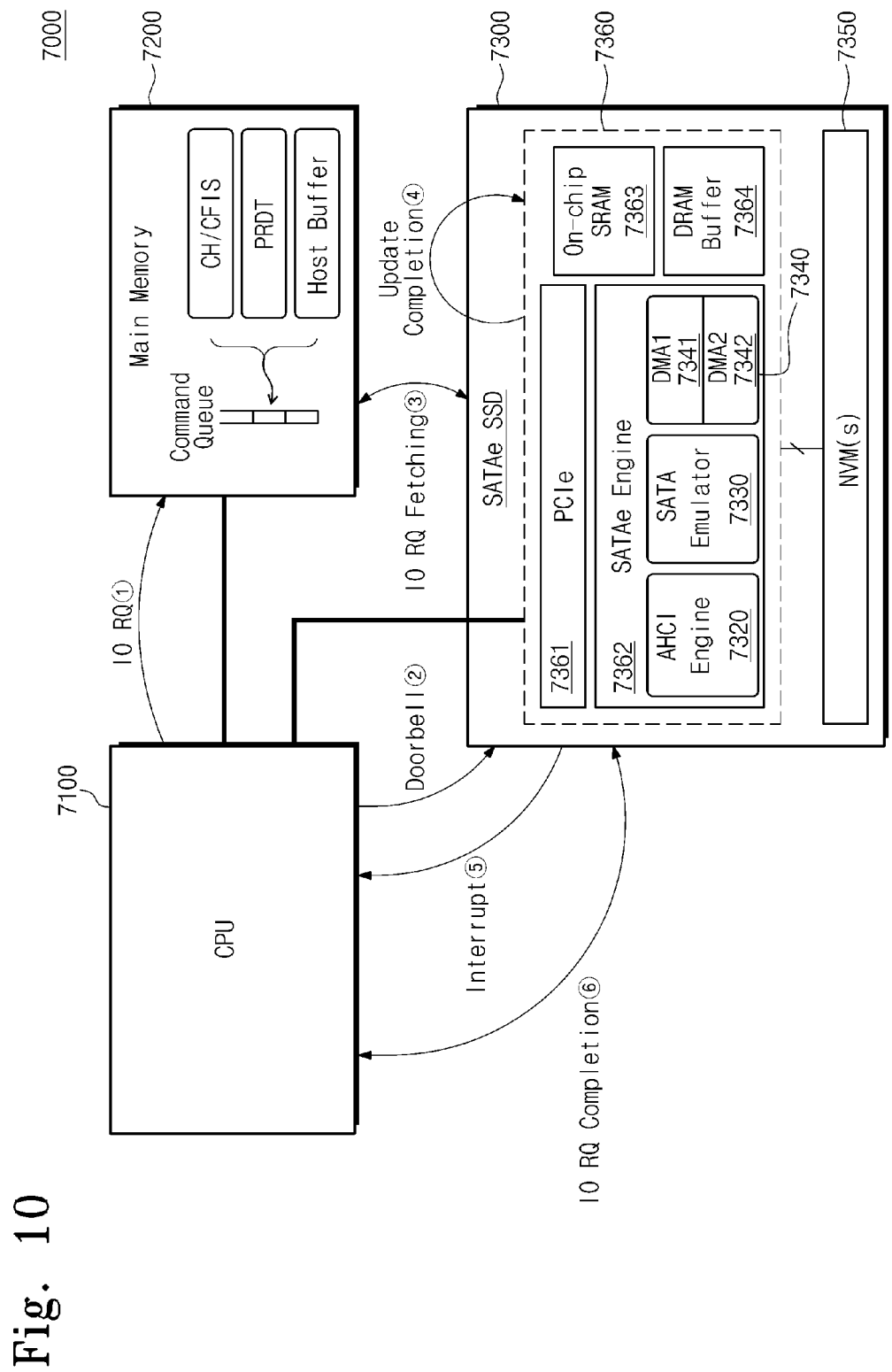
FIG. 10 is a diagram schematically illustrating a computing system according to still another example embodiment of the inventive concepts.

FIG. 10 is a diagram schematically illustrating a computing system according to still another embodiment of the inventive concepts. Referring to FIG. 10, a computing system 7000 may include a CPU 7100, a main memory 7200, and a SATAe storage device 7300.

The SATAe storage device 7300 may include a nonvolatile memory device 7350 and a SATA controller 7360 configured to control the nonvolatile memory device 7350.

The SATA controller 7360 may include a PCIe interface circuit 7361, a SATAe engine 7362, an on-chip static random access memory (SRAM) 7363 and a dynamic random access memory (DRAM) buffer 7364. The SATAe engine 7362 may include an AHCI engine 7320, a SATA emulator 7330, and a DMA circuit 7340. The PCIe interface circuit 7361 may include an address translation unit ATU and first and second outbound areas OB1 and OB2. The DMA circuit 7340 may include a transmission DMA circuit 7341 for data transmission and a reception DMA circuit 7342 for data reception.

An input/output request IO RQ may be made as follow.

If the input/output request IO RQ is available, the CPU 7100 may send the input/output request IO RQ to the main memory 7200 (①). A command queue corresponding to the input/output request IO RQ may include a command header/command FIS, a physical region descriptor table PRDT, a host buffer, and/or other like information. According to various embodiments, a physical region descriptor table PRDT may be a table for storing a structure directing a memory area where data to be transferred to a host or data transferred from the host is stored. The physical region descriptor table PRDT may include a size and an address of a corresponding memory area.

The CPU 7100 may provide the SATAe storage device 7300 with doorbell information indicating that the input/output request IO RQ is made (②). The AHCI engine 7320 of the SATAe storage device 7300 may include a host register (e.g., PxCI) to store the doorbell information. The SATAe storage device 7300 may fetch the input/output request IO RQ by sending FIS related information to the main memory 7200 in response to the input/output request IO RQ (③). Also, FIS corresponding to the input/output request IO RQ may be automatically updated (④). A data transfer according to the input/output request IO RQ may be performed between the main memory 7200 and the SATAe storage device 7300 via the transmission DMA circuit 7341 and the reception DMA circuit 7342. When a data transfer operation is completed, the SATAe storage device 7300 may send an interrupt to the CPU 7100 (⑤). Based on the interrupt, the CPU 7100 may provide the SATAe storage device 7300 with information indicating that the input/output request IO RQ is completed (⑥).

The computing system 7000 may perform a full duplex data transfer operation between the main memory 7200 and the SATAe storage device 7300 according to the input/output request IO RQ.

FIG. 11 is a diagram schematically illustrating a PCI header of a data packet input or output in or from an AHCI engine 7320 of FIG. 10. Referring to FIG. 11, ABAR may be an AHCI base address. A start address of a host control register may have a value corresponding to ABAR plus '0x0000', and a start address of a port register may have a value corresponding to ABAR minus '0x0000'.

FIG. 12 is a diagram schematically illustrating host control information stored at an AHCI engine 7320 of FIG. 10. Referring to FIG. 12, host registers corresponding to addresses ranging from '00h' to '03h' may store information regarding host capabilities, and host control registers corresponding to addresses ranging from '0Ch' to '0Fh' may store information regarding ports implemented.

FIG. 13 is a diagram schematically illustrating port information stored at an AHCI engine 7320 of FIG. 10. Referring to FIG. 13, port registers corresponding to addresses ranging from '00h' to '03h' may store port information on a command list base address, port registers corresponding to addresses ranging from '28h' to '2Bh' may store port information on a SATA status, and port registers corresponding to addresses ranging from '38h' to '3Bh' may store port information on a command issue.

FIGS. 14A to 14H are diagrams schematically illustrating the specification on FIS transferred between an AHCI engine 7320 and a SATA emulator 7330 of FIG. 10. Referring to FIGS. 14A to 14H, the FIS specification may satisfy the SATA 3.0 specification. FIG. 14a shows FIS types, FIG. 14B shows a H2D FIS layout, FIG. 14C shows a D2H FIS layout, FIG. 14D shows a PIO setup FIS layout, FIG. 14E shows a DMA setup FIS layout, FIG. 14F shows a DMA activate FIS layout, FIG. 14G shows a data FIS layout, and FIG. 14H shows an SDB FIS layout.

Figure 15:
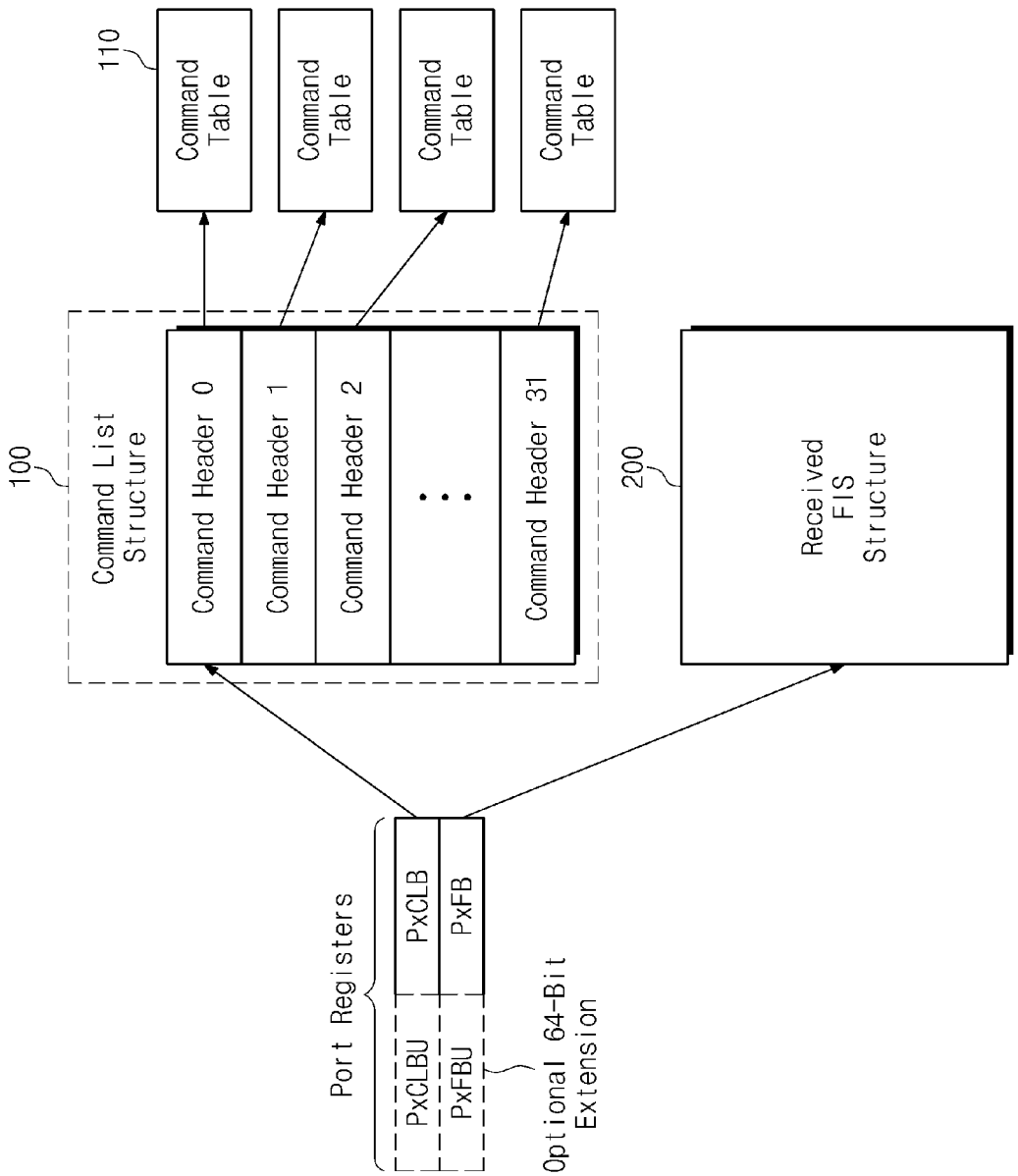
FIG. 15 is a diagram schematically illustrating a structure of a host buffer in a main memory of FIG. 10.

FIG. 15 is a diagram schematically illustrating a structure of a host buffer in a main memory 7200 of FIG. 10. Referring to FIG. 15, a port register PxCLB may store a command list structure (e.g., a command queue) having a plurality of commands for distinguishing a command table CT, and a port register PxFB may store an input FIS structure. A base address of a host buffer in a main memory 7200 on the command list structure may be distinguished via the port register PxCLB. A base address of a host buffer in the main memory 7200 on the FIS structure may be distinguished via the port register PxFB.

Figure 16:
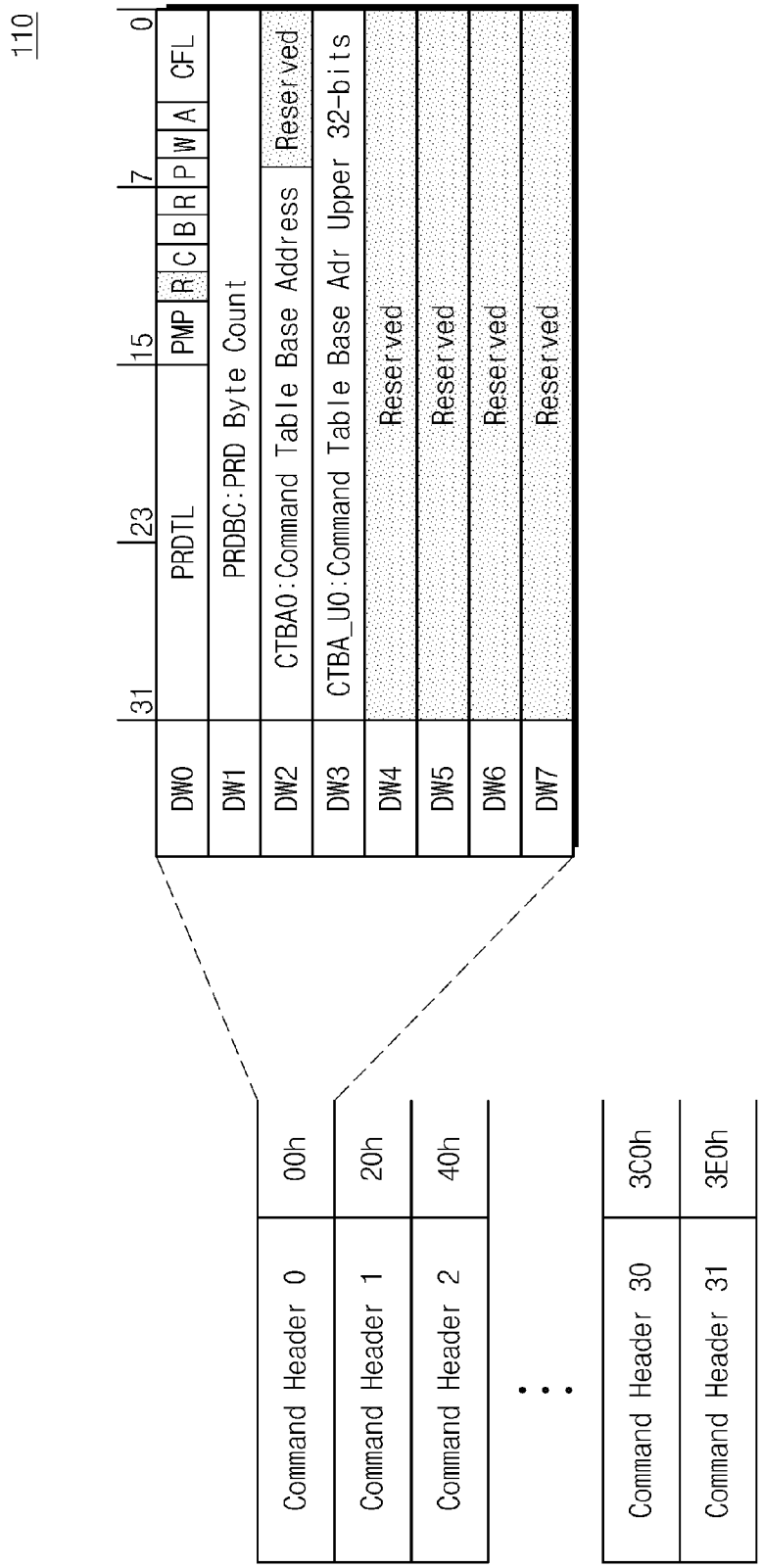
FIG. 16 is a diagram schematically illustrating a command list structure of FIG. 15.

FIG. 16 is a diagram schematically illustrating a command list structure of FIG. 15. Referring to FIG. 16, each of command headers may store command table base address DW2 and command table base address upper 32-bits DW3.

Figure 17:
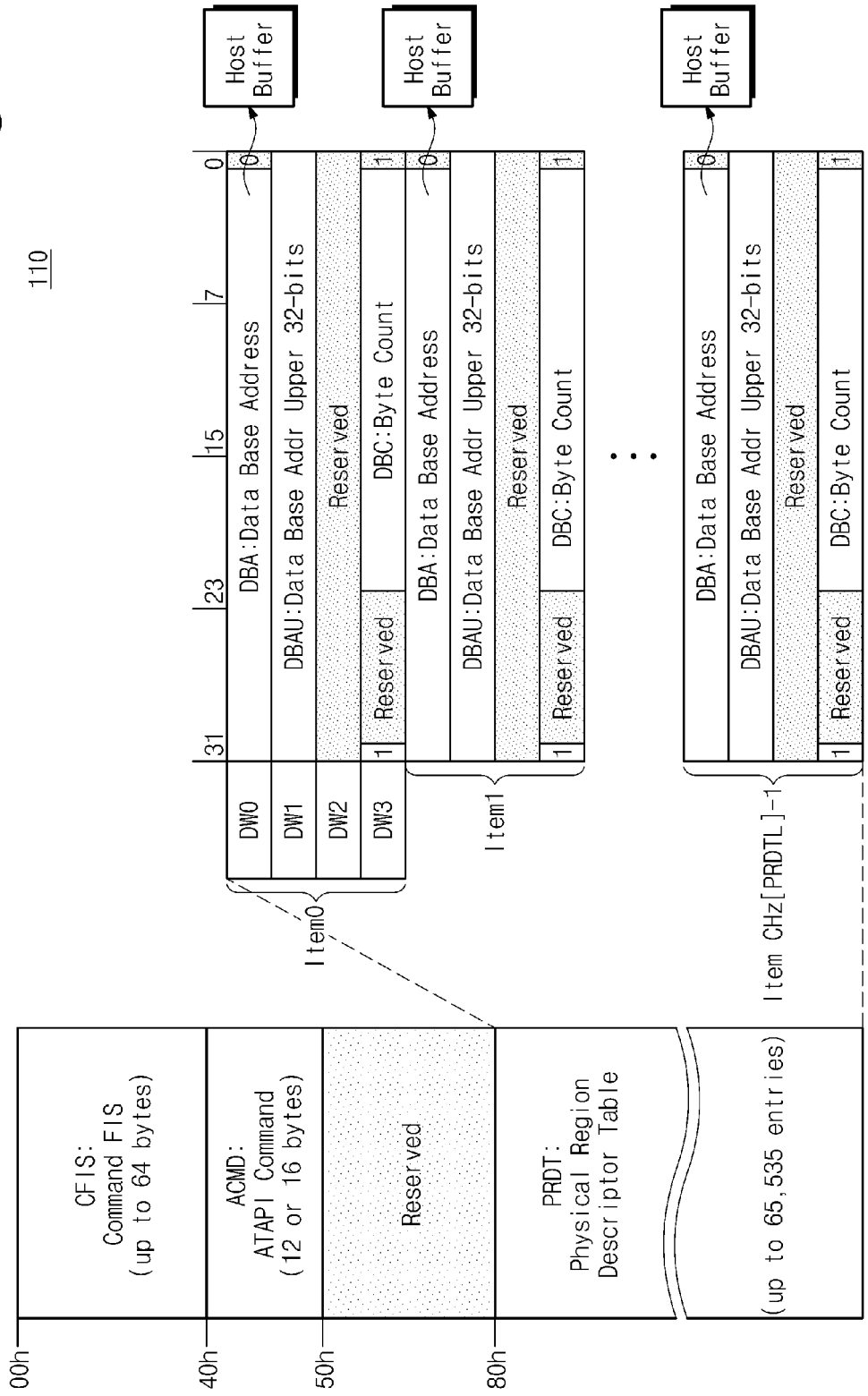
FIG. 17 is a diagram schematically illustrating a command table of FIG. 16.

FIG. 17 is a diagram schematically illustrating a command table of FIG. 16. Referring to FIG. 17, a command table may include a physical region descriptor table PRDT which has a plurality of items Item0 to Item CHz[PRDTL]-1. According to various embodiments, each of the items Item0 to Item CHz[PRDTL]-1 may include a data base address DBA. The data base address DBA may be stored at a host buffer of a main memory 7200, and the physical region descriptor table PRDT may be used for prefetching.

Figure 18:
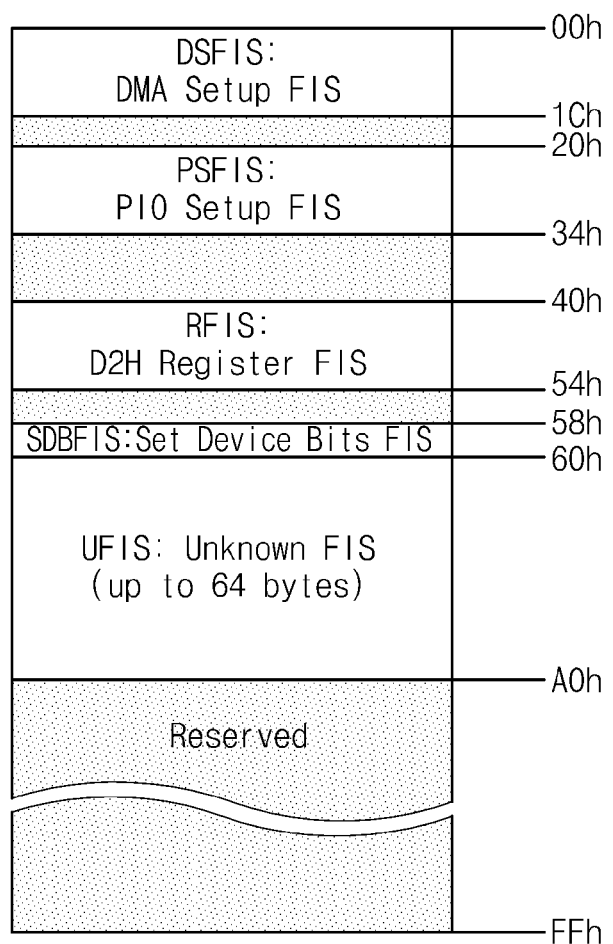
FIG. 18 is a diagram schematically illustrating an input Received FIS structure of FIG. 15.

FIG. 18 is a diagram schematically illustrating an input Received FIS structure of FIG. 15. Referring to FIG. 18, FIS may include a DMA setup FIS region, a PIO setup FIS region, a D2H register FIS region, an unknown FIS region, and a reserved region.

Figure 19:
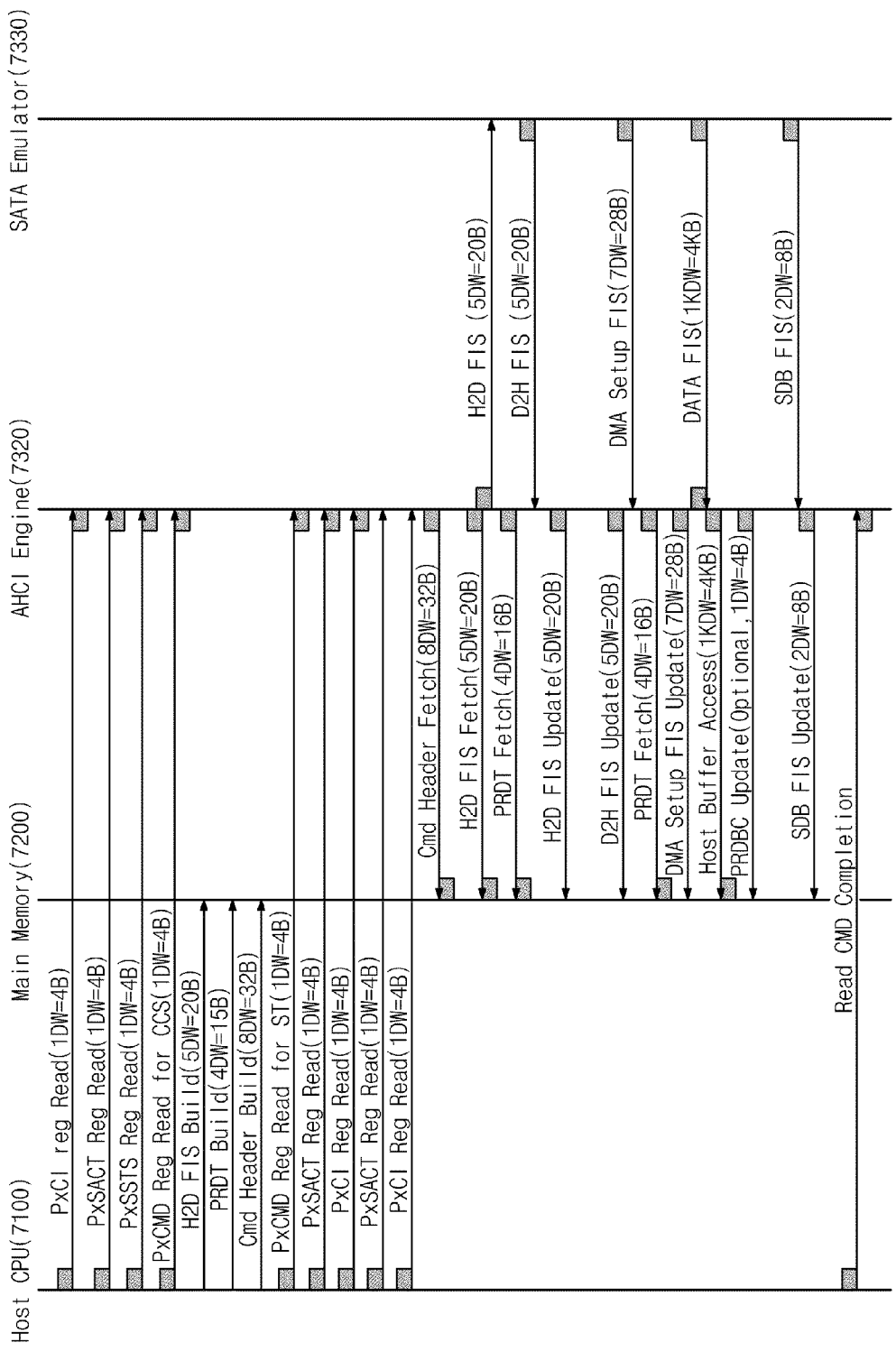
FIG. 19 is a diagram schematically illustrating a procedure where a computing system of FIG. 10 executes a read command, according to an example embodiment.

FIG. 19 is a diagram schematically illustrating a procedure where a computing system of FIG. 10 executes a read command. Referring to FIG. 19, a register PxCI of an AHCI engine 7320 may receive an NCQ command, and the AHCI engine 7320 may fetch a command by exchanging FIS information according to the NCQ command with a SATAe emulator 7330 and sending associated FIS information (CH, H2D, FIS, PRD table, etc.) to a main memory 7200. Afterwards, a SATAe engine 7362 may access the main memory 7200, so that input/output data according to the command is transmitted. Afterwards, DMA setup FIS and SDB FIS according to the SATA specification may be sent from the SATAe emulator 7330 to the AHCI engine 7320 and the AHCI engine 7320 may transfer the DMA setup FIS and SDB FIS to the main memory 7200. Afterwards, information on read completion may be sent to the AHCI engine 7320.

While the inventive concepts has been described with reference to exemplary embodiments, it will be apparent to those skilled in the art that various changes and modifications may be made without departing from the spirit and scope of the present invention. Therefore, it should be understood that the above embodiments are not limiting, but illustrative.

What is claimed is:

1. A data transfer method of a storage device, the storage device including a host bus adaptor configured to communicate with an external host device via a first interface and to communicate internally via a second interface, the data transfer method comprising:
   receiving a write command and a read command at the host bus adaptor;
   performing, by the storage device, a read direct memory access operation using the first interface in response to the write command and simultaneously performing a write direct memory access operation using the first interface in response to the read command; and
   generating, by the storage device, frame information structure (FIS) sequences according to the second interface in response to the received write command and the received read command,
   the first interface performing a full duplex data transfer and the second interface performing a half-duplex data transfer.

2. The data transfer method of claim 1, wherein the host bus adaptor receives the received write command and the received read command according to a native command queuing (NCQ).

3. The data transfer method of claim 1, further comprising:
   before receiving the write command and the read command, sending information indicating whether a prior command of the storage device is completed to the external host device through the host bus adapter.

4. The data transfer method of claim 1, further comprising:
   fetching a command by fetching a frame information structure (FIS) corresponding to each of the received write command and the received read command through the host bus adapter from the external host device.

5. The data transfer method of claim 1, wherein the FIS sequences include at least one of a direct memory access setup frame information structure (DMA Setup FIS), a program IO setup frame information structure (PIO Setup FIS), a data frame information structure (Data FIS), and a set device bit frame information structure (SDB FIS).

6. The data transfer method of claim 5, wherein the plurality of FIS sequences further include a non-data frame information structure.

7. The data transfer method of claim 1, wherein the FIS is generated after the read and write direct memory access operations are completed.

8. A data transfer method of a computing system which includes a central processing unit (CPU), a main memory, and a storage device, the storage device including a host bus adaptor to communicate with the CPU via a first interface and to communicate internally with an emulator via a second interface, the data transfer method comprising:
   transferring, by the CPU, a command queue entry corresponding to an input/output request from the CPU to the main memory;
   transferring, by the CPU to the host buffer adaptor, information indicating that the input/output request from the CPU to the main memory has been made;
   fetching, by the emulator, the input/output request by fetching a frame information structure (FIS) from the main memory in response to the information, the FIS corresponding to the input/output request;
   performing a data transfer between the main memory and the storage device, the data transfer corresponding to the input/output request, the data transfer being made according to the first interface at the storage device;
   generating, by the host bus adaptor, a FIS sequence according to the second interface after the data transfer;
   generating, by the host bus adaptor, an interrupt at the storage device; and
   completing, by the CPU, the input/output request based on the interrupt.

9. The data transfer method of claim 8, wherein the first interface is configured to perform a full duplex data transfer and the second interface is configured to perform a half-duplex data transfer.

10. The data transfer method of claim 8, wherein the first interface is a Peripheral Component Interconnect express (PCIe) interface and the second interface is a Serial Advanced Technology Attachment (SATA) interface.

11. A storage device, comprising:
    a first interface circuit configured to transmit and receive data according to a first interface;
    a host bus adaptor configured to communicate with the first interface circuit according to the first interface;
    a second interface emulator configured to communicate with the host bus adaptor according to a second interface based on a half-duplex data transfer;
    a direct memory access circuit configured to perform a data transfer via the first interface circuit with an external host memory based on a full duplex data transfer;
    at least one nonvolatile memory device configured to store data; and
    a memory controller configured to control the at least one nonvolatile memory device according to an input/output request, the input/output request being output from the second interface emulator, and
    wherein the host bus adaptor is further configured to generate a frame information structure (FIS) sequence after the data transfer according to the second interface and send the generated FIS sequence to the first interface circuit.

12. The storage device of claim 11, wherein the first interface is a Peripheral Component Interconnect express (PCIe) interface and the second interface is a Serial Advanced Technology Attachment (SATA) interface.

13. A computing system, comprising:
    a host bus;
    a host processor connected with the host bus via a first interface;
    a RAID controller connected with the host bus via the first interface and configured to perform a RAID function; and
    a plurality of storage devices connected with the RAID controller via the first interface, at least one of the plurality of storage devices includes,
      a first interface circuit configured to communicate with the RAID controller according to the first interface,
      a host bus adaptor configured to communicate with the first interface circuit according to the first interface,
      a second interface emulator configured to communicate with the host bus adaptor according to a second interface,
    a direct memory access circuit configured to perform a data transfer with an external host memory through the host bus adaptor a full duplex data transfer from the first interface;
    at least one nonvolatile memory device configured to store data, and
    a memory controller configured to control the at least one nonvolatile memory device according to an input/output request output from the second interface emulator, and wherein the host bus adaptor is further configured to generate a frame information structure (FIS) sequence after the data transfer according to the second interface and send the generated FIS sequence to the first interface circuit.

14. The computing system of claim 13, wherein at least one other storage device of the plurality of storage devices is a hard disk drive.

15. The computing system of claim 13, wherein the first interface circuit comprises:
a PCIe physical layer configured to convert at least one of an analog signal received from the host bus into digital data and the PCIe physical layer configured to convert digital data to be transmitted into an analog signal.

16. The computing system of claim 15, wherein the first interface circuit further comprises:
a PCIe link layer configured to convert data transmitted and received at the PCIe physical layer into a data packet according to the first interface.

17. The computing system of claim 13, wherein the host bus adaptor is an Advanced Host Controller Interface (AHCI) controller.

18. The computing system of claim 17, wherein the AHCI controller communicates with the host processor via a PCIe link layer.

19. The computing system of claim 13, wherein the direct memory access circuit comprises:
a first direct memory access circuit configured to read data from the host memory; and
a second direct memory access circuit configured to write data at the host memory, the first and second direct memory access circuits configured to operate in parallel such that the first and second direct memory access circuits perform a full duplex data transfer of the first interface.

20. A computing system comprising:
a processor;
a main memory, the main memory configured to receive an input/output request from the processor; and
a storage device configured to,
receive doorbell information from the processor indicating that the input/output request has been made,
fetch the input/output request from the main memory by fetching a frame information structure (FIS) in response to receiving the doorbell information,
automatically update the nonvolatile memory device with the FIS related information corresponding to the input/output request,
perform a data transfer operation according to the input/output request, the data transfer operation being performed between the main memory and the storage device,
send an interrupt to the processor when the data transfer operation is completed, and
receive, from the processor, information indicating that the input/output request is completed in response to the interrupt.

21. The computing system of claim 20, wherein the storage device includes a nonvolatile memory device and a memory controller configured to control the nonvolatile memory device.

22. The computing system of claim 21, wherein the memory controller comprises:
a Peripheral Component Interconnect express (PCIe) interface circuit;
a Serial Advanced Technology Attachment express (SATAe) engine including an Advanced Host Controller Interface (AHCI) engine, a Serial Advanced Technology Attachment (SATA) emulator, and a direct memory access (DMA) circuit;
an on-chip static random access memory (SRAM); and
a dynamic random access memory (DRAM) buffer.

23. The computing system of claim 22, wherein the data transfer operation is performed via the transmission DMA circuit and the reception DMA circuit.

24. The computing system of claim 22, wherein the AHCI engine of the SATAe engine each include a host register configured to store the doorbell information.

25. The computing system of claim 20, wherein a command queue corresponds to the input/output request, and the command queue includes at least one of a command header/command FIS, a physical region descriptor table PRDT, and a host buffer.

* * * * *